(12) United States Patent
Petersson et al.

(10) Patent No.: US 12,352,013 B2
(45) Date of Patent: Jul. 8, 2025

(54) CONTROL UNIT

(71) Applicant: Volvo Construction Equipment AB, Eskilstuna (SE)

(72) Inventors: Mikael Petersson, Växjö (SE); Norbert Rosenpek, Växjö (SE); Erik Petersson, Växjö (SE)

(73) Assignee: Volvo Construction Equipment AB, Eskilstuna (SE)

( * ) Notice: Subject to any disclaimer, the term of this patent is extended or adjusted under 35 U.S.C. 154(b) by 197 days.

(21) Appl. No.: 17/926,135

(22) PCT Filed: May 18, 2021

(86) PCT No.: PCT/EP2021/063125
§ 371 (c)(1),
(2) Date: Nov. 18, 2022

(87) PCT Pub. No.: WO2021/233908
PCT Pub. Date: Nov. 25, 2021

(65) Prior Publication Data
US 2023/0243125 A1    Aug. 3, 2023

(30) Foreign Application Priority Data

May 18, 2020    (SE) .................................. 2050577-2

(51) Int. Cl.
*E02F 9/22*    (2006.01)
*E02F 9/02*    (2006.01)
*E02F 9/20*    (2006.01)

(52) U.S. Cl.
CPC ................ *E02F 9/226* (2013.01); *E02F 9/02* (2013.01); *E02F 9/2025* (2013.01);
(Continued)

(58) Field of Classification Search
CPC . E02F 9/226; E02F 9/02; E02F 9/2025; E02F 9/2217; E02F 9/2228; E02F 9/2278;
(Continued)

(56) References Cited

U.S. PATENT DOCUMENTS 6,354,089 B1 *    3/2002    Lech ..................... E02F 9/2292
                                                        62/50.2
2010/0303636 A1    12/2010    Tamai et al.
(Continued)

OTHER PUBLICATIONS

International Search Report and Written Opinion of the International Searching Authority, PCT/EP2021/063125, mailed Sep. 16, 2021, 14 pages.
(Continued)

*Primary Examiner* — Aaron L Troost
(74) *Attorney, Agent, or Firm* — Sage Patent Group

(57) ABSTRACT

The present invention relates to a control unit for a vehicle. The vehicle includes a wheel axle fluid circuit adapted to feed wheel axle fluid to one or more wheel axles of the vehicle. The vehicle further includes a propulsion assembly adapted to propel the vehicle. The control unit is adapted to, on the basis of at least the following:
  information indicative of the propulsion assembly being inactive,
  information indicative of an expected time range until an expected operation start time of the vehicle, and
  information associated with a temperature of the wheel axle fluid,
determine whether or not a conditioning procedure, during which the temperature of the wheel axle fluid is increased as compared to a present temperature of the wheel axle fluid, should be initiated for the wheel axle fluid.

16 Claims, 3 Drawing Sheets

(52) U.S. Cl.
CPC .......... *E02F 9/2217* (2013.01); *E02F 9/2228* (2013.01); *E02F 9/2278* (2013.01); *E02F 9/2292* (2013.01)

(58) Field of Classification Search
CPC ... E02F 9/2292; F16H 57/0413; F15B 21/045
See application file for complete search history.

(56) References Cited

U.S. PATENT DOCUMENTS

| | | | |
|---|---|---|---|
| 2016/0221417 A1* | 8/2016 | Ito | B60H 1/2218 |
| 2017/0210390 A1* | 7/2017 | Porras | B60K 6/40 |
| 2018/0172137 A1* | 6/2018 | Yamazaki | F16H 57/0483 |
| 2019/0145438 A1 | 5/2019 | Jones et al. | |

OTHER PUBLICATIONS

International Preliminary Report on Patentability of the International Preliminary Examining Authority, PCT/EP2021/063125, mailed Aug. 19, 2022, 20 pages.

\* cited by examiner

CONTROL UNIT

CROSS REFERENCE TO RELATED APPLICATIONS

This application is a 35 U.S.C. § 371 national stage application of PCT International Application No. PCT/EP2021/063125 filed on May 18, 2021, which in turn claims foreign priority to Swedish Patent Application No. 2050577-2 filed on May 18, 2020, the disclosures and content of which are incorporated by reference herein in their entirety.

TECHNICAL FIELD

The present invention relates to a control unit for a vehicle. Moreover, the present invention relates to a vehicle. Furthermore, the present invention relates to a method for controlling a wheel axle fluid circuit of a vehicle.

The invention is for instance applicable on working machines within the fields of industrial construction machines or construction equipment, in particular wheel loaders. Although the invention will be described with respect to a wheel loader, the invention is not restricted to this particular machine, but may also be used in other working machines such as articulated haulers, excavators and backhoe loaders.

BACKGROUND

Nowadays, it may be desired that a vehicle be preconditioned, i.e. set so as to reach a preferred condition when or before the vehicle is intended to be operated. For instance, US 2017/0210390 A1 discloses a method for preconditioning various subsystems of an electrified vehicle.

However, there is a need for further improvement relating to vehicle preconditioning.

SUMMARY

In view of the above, an object of the present invention is to provide a control unit that in an appropriate manner can be used for determining whether or not a vehicle conditioning procedure should be initiated.

This object is achieved by a control unit according to claim 1.

As such, a first aspect of the present invention relates to a control unit for a vehicle. The vehicle comprises a wheel axle fluid circuit adapted to feed wheel axle fluid to one or more wheel axles of the vehicle. The vehicle further comprises a propulsion assembly adapted to propel the vehicle.

The control unit is adapted to, on the basis of at least the following:
information indicative of the propulsion assembly being inactive,
information indicative of an expected time range until an expected operation start time of the vehicle, and
information associated with a temperature of the wheel axle fluid, determine whether or not a conditioning procedure, during which the temperature of the wheel axle fluid is increased as compared to a present temperature of the wheel axle fluid, should be initiated for the wheel axle fluid.

As used herein, the term "wheel axle fluid" encompasses any fluid that is related to a wheel axle of a vehicle. Purely by way of example, the term "wheel axle fluid" may include one or more of the following: lubricant axel fluid and hydraulic brake fluid.

As such, what the inventors of the present invention have realized is that information associated with a temperature of the wheel axle fluid may be useful information when determining whether or not a conditioning procedure should be initiated. This is since a too cold wheel axle fluid may have an adverse effect on the operation of the vehicle. Purely by way of example, a cold wheel axle fluid, such as a cold lubricant axel fluid, may imply high energy losses when operating the vehicle and such energy losses may be reduced when carrying out the conditioning procedure.

Optionally, the control unit is adapted to determine an energy loss value indicative of energy losses associated with operating the vehicle without initiating the conditioning procedure. The control unit is further adapted to determine a conditioning value indicative of the energy required for the conditioning procedure. The control unit is adapted to determine that the conditioning procedure should be initiated in response to determining that the conditioning value is smaller than the energy loss value.

The conditioning procedure will generally require energy, e.g. energy supplied from a power source of the vehicle. If the vehicle for instance is intended to be operated only a short period after start, it may be unnecessary to initiate the conditioning procedure. As such, the above possibility, in which the conditioning value and the energy loss value are determined and compared, implies a reduced risk in an inappropriate initiation of the conditioning procedure.

Optionally, the control unit is adapted to, in response to determining that the conditioning procedure should be initiated, issue a signal to the vehicle to initiate the conditioning procedure. As such, the control unit may also be adapted to initiate the conditioning procedure.

Optionally, the wheel axle fluid circuit comprises a wheel axle fluid pump arrangement adapted to circulate the wheel axle fluid through the wheel axle fluid circuit. The control unit is adapted to, in response to determining that the conditioning procedure should be initiated, issue a wheel axle fluid pump arrangement control signal to the wheel axle fluid pump arrangement to circulate the wheel axle fluid through the wheel axle fluid circuit to thereby increase the temperature of the wheel axle fluid prior to the expected operation start time of the vehicle.

The temperature of the wheel axle fluid may be increased in a plurality of ways when circulating the same through the wheel axle fluid circuit. Purely by way of example, the temperature may be increased due to friction between the wheel axle fluid and the wheel axle fluid circuit. Other alternatives for increasing the wheel axle fluid temperature are presented hereinbelow.

Optionally, the vehicle comprises a wheel axle fluid heat exchanger. The wheel axle fluid circuit is fluidly connected to the wheel axle fluid heat exchanger such that wheel axle fluid passes through the wheel axle fluid heat exchanger when the wheel axle fluid is circulated through the wheel axle fluid circuit. The control unit is adapted to, in response to determining that the conditioning procedure should be initiated, issue a wheel axle fluid heat exchanger control signal such that the wheel axle fluid heat exchanger adds heat to the wheel axle fluid.

As such, the wheel axle fluid heat exchanger implies an appropriate heating of the wheel axle fluid.

Optionally, the vehicle further comprises a transmission fluid pump as well as a transmission converter, the transmission fluid pump being adapted to feed transmission fluid to the transmission converter, the transmission converter being arranged in relation to the wheel axle fluid heat exchanger such that transmission fluid leaving the transmission converter can be used as a heat source for the wheel axle fluid heat exchanger, the control unit being adapted to, in response to determining that the conditioning procedure should be initiated, issue a transmission fluid pump control signal to the transmission fluid pump such that the transmission fluid pump feeds transmission fluid to the transmission converter as well as to issue a transmission converter control signal to the transmission converter to assume a transmission converter operating condition in which the temperature of the transmission fluid leaving the transmission converter is higher than the temperature of the transmission fluid entering the transmission converter.

As such, the transmission fluid leaving the transmission converter may be used for heating the wheel axle fluid. Moreover, in addition to heating the wheel axle fluid, the increased temperature of the transmission fluid leaving the transmission converter also implies that the transmission converter as such is heated which in turn implies that the transmission converted may operate with reasonable energy losses once the vehicle is operated.

The transmission fluid leaving the transmission converter can be used as a heat source for the wheel axle fluid heat exchanger in a plurality of different ways. Purely by way of example, the transmission fluid leaving the transmission converter may be fed directly to the wheel axle fluid heat exchanger. As such, the transmission fluid leaving the transmission converter can be used directly in the wheel axle fluid heat exchanger.

As another alternative, the vehicle may comprise a transmission fluid heat exchanger being in fluid communication with the transmission converter as well as the wheel axle fluid heat exchanger so as to enable that transmission fluid leaving the transmission converter can be used as a heat source for the wheel axle fluid heat exchanger. As such, heat from the transmission fluid leaving the transmission converter can be used indirectly in the wheel axle fluid heat exchanger.

Optionally, the vehicle comprises a transmission fluid pump power source adapted to power at least the transmission fluid pump. The control unit is adapted to, in response to determining that the conditioning procedure should be initiated, issue a transmission fluid pump power source control signal to the vehicle such that the transmission fluid pump power source feeds energy to the transmission fluid pump.

Optionally, the vehicle comprises an implement fluid circuit with an implement fluid pump. The wheel axle fluid pump arrangement comprises a wheel axle fluid motor and a wheel axle fluid pump. The wheel axle fluid motor is mechanically connected to the wheel axle fluid pump. The implement fluid circuit is connected to the wheel axle fluid pump arrangement such that implement fluid in the implement fluid circuit can power the wheel axle fluid motor. The control unit is adapted to, in response to determining that the conditioning procedure should be initiated, issue an implement fluid pump control signal such that the implement fluid in the implement fluid circuit powers the wheel axle fluid motor.

As such, the implement fluid pump may be used for obtaining a flow in the wheel axle fluid circuit. Moreover, when implement fluid flows in the implement fluid circuit, the temperature thereof increases. The thus heated implement fluid powers the wheel axle fluid motor which implies a heat exchange over the wheel axle fluid pump arrangement, viz from the implement fluid to the wheel axle fluid via the wheel axle fluid motor and the wheel axle fluid pump.

Optionally, the implement fluid circuit comprises a variable implement fluid constriction. The control unit is adapted to, in response to determining that the conditioning procedure should be initiated, issue an implement fluid constriction control signal to the implement fluid constriction such that a flow restriction is imposed on the implement fluid, thereby increasing the temperature of the implement fluid.

The above implies that an appropriate temperature of the implement fluid which in turn implies an appropriate heating of the wheel axle fluid.

Optionally, the vehicle comprises an implement fluid pump power source adapted to power at least the implement fluid pump. The control unit is adapted to, in response to determining that the conditioning procedure should be initiated, issue an implement fluid pump power source control signal to the vehicle such that the implement fluid pump power source feeds energy to the implement fluid pump.

Optionally, a single power source constitutes the transmission fluid pump power source as well as the implement fluid pump power source.

Optionally, the information associated with the temperature of the wheel axle fluid comprises information as regards a temperature ambient of the vehicle. Information indicative of the ambient temperature may be useful when determining whether or not a conditioning procedure needs to be initiated.

Optionally, the information associated with the temperature of the wheel axle fluid comprises information as regards a temperature of the wheel axle fluid. Information indicative of the temperature of the wheel axle fluid may be useful for determining whether or not a conditioning procedure needs to be initiated. Purely by way of example, information as regards the temperature of the wheel axle fluid may be used for estimating energy losses associated with operating the vehicle without initiating the conditioning procedure as has been discussed hereinabove.

Optionally, the wheel axle fluid circuit comprises a brake fluid circuit adapted to feed brake fluid to one or more brakes of the vehicle.

Optionally, the wheel axle fluid circuit comprises a wheel axle lubricant fluid circuit adapted to feed lubricant fluid to one or more wheel axles of the vehicle.

A second aspect of the present invention relates to a vehicle comprising a wheel axle fluid circuit adapted to feed wheel axle fluid to one or more wheel axles of the vehicle. The vehicle comprises a control unit according to the first aspect of the present invention.

Optionally, the wheel axle fluid circuit comprises a wheel axle fluid pump arrangement adapted to circulate the wheel axle fluid through the wheel axle fluid circuit.

Optionally, the vehicle comprises a wheel axle fluid heat exchanger. The wheel axle fluid circuit is fluidly connected to the wheel axle fluid heat exchanger such that wheel axle fluid passes through the wheel axle fluid heat exchanger when the wheel axle fluid is circulated through the wheel axle fluid circuit.

Optionally, the vehicle further comprises a transmission fluid pump as well as a transmission converter. The transmission fluid pump is adapted to feed transmission fluid to the transmission converter, the transmission converter being arranged in relation to the wheel axle fluid heat exchanger such that transmission fluid leaving the transmission converter can be used as a heat source for the wheel axle fluid heat exchanger.

Optionally, the vehicle further comprises a transmission fluid heat exchanger being in fluid communication with the transmission converter as well as the wheel axle fluid heat exchanger so as to enable that transmission fluid leaving the transmission converter can be used as a heat source for the wheel axle fluid heat exchanger.

Optionally, the vehicle further comprises a heat exchanger circuit adapted to circulate a heat exchanger fluid between the transmission fluid heat exchanger and the wheel axle fluid heat exchanger.

A third aspect of the present invention relates to a method for controlling a wheel axle fluid circuit of a vehicle. The wheel axle fluid circuit is adapted to feed wheel axle fluid to one or more wheel axles of the vehicle. The vehicle further comprises a propulsion assembly adapted to propel the vehicle, wherein the method comprises, on the basis of at least the following:

information indicative of the propulsion assembly being inactive,
information indicative of an expected time range until an expected operation start time of the vehicle, and
information associated with a temperature of the wheel axle fluid, determining whether or not a conditioning procedure, during which the temperature of the wheel axle fluid is increased as compared to a present temperature of the wheel axle fluid, should be initiated for the wheel axle fluid.

Optionally, the method further comprises determining an energy loss value indicative of energy losses associated with operating the vehicle without initiating the conditioning procedure. The method further comprises determining a conditioning value indicative of the energy required for the conditioning procedure. The method comprises determining that the conditioning procedure should be initiated in response to determining that the conditioning value is smaller than the energy loss value.

Optionally, the method further comprises, in response to determining that the conditioning procedure should be initiated, initiating the conditioning procedure.

Optionally, the wheel axle fluid circuit comprises a wheel axle fluid pump arrangement adapted to circulate the wheel axle fluid through the wheel axle fluid circuit. The method comprises, in response to determining that the conditioning procedure should be initiated, circulating the wheel axle fluid through the wheel axle fluid circuit to thereby increase the temperature of the wheel axle fluid prior to the expected operation start time of the vehicle.

Optionally, the vehicle comprises a wheel axle fluid heat exchange. The wheel axle fluid circuit is fluidly connected to the wheel axle fluid heat exchanger such that wheel axle fluid passes through the wheel axle fluid heat exchanger when the wheel axle fluid is circulated through the wheel axle fluid circuit. The method comprises, in response to determining that the conditioning procedure should be initiated, controlling the wheel axle fluid heat exchanger such that the wheel axle fluid heat exchanger adds heat to the wheel axle fluid.

Optionally, the vehicle further comprises a transmission fluid pump as well as a transmission converter. The transmission fluid pump is adapted to feed transmission fluid to the transmission converter. The transmission converter is arranged in relation to the wheel axle fluid heat exchanger such that transmission fluid leaving the transmission converter can be used as a heat source for the wheel axle fluid heat exchanger. The method comprises, in response to determining that the conditioning procedure should be initiated, operating the transmission fluid pump to feed transmission fluid to the transmission converter as well as operating the transmission converter so as to assume an operating condition in which the temperature of the transmission fluid leaving the transmission converter is higher than the temperature of the transmission fluid entering the transmission converter.

Optionally, the vehicle further comprises a transmission fluid heat exchanger being in fluid communication with the transmission converter as well as the wheel axle fluid heat exchanger so as to enable that transmission fluid leaving the transmission converter can be used as a heat source for the wheel axle fluid heat exchanger. The method comprises feeding the transmission fluid leaving the transmission converter to the transmission fluid heat exchanger.

Optionally, the vehicle further comprises a transmission fluid pump power source adapted to power at least the transmission fluid pump. The method comprises, in response to determining that the conditioning procedure should be initiated, operating the transmission fluid pump power source so as to feed energy to the transmission fluid pump.

Optionally, the vehicle comprises an implement fluid circuit with an implement fluid pump. The wheel axle fluid pump arrangement comprises a wheel axle fluid motor and a wheel axle fluid pump. The wheel axle fluid motor is mechanically connected to the wheel axle fluid pump. The implement fluid circuit is connected to the wheel axle fluid pump arrangement such that implement fluid in the implement fluid circuit can power the wheel axle fluid motor. The method comprises, in response to determining that the conditioning procedure should be initiated, operating the implement fluid pump such that the implement fluid in the implement fluid circuit powers the wheel axle fluid motor.

Optionally, the implement fluid circuit comprises a variable implement fluid constriction. The method comprises, in response to determining that the conditioning procedure should be initiated, controlling the variable implement fluid constriction such that a flow restriction is imposed on the implement fluid, thereby increasing the temperature of the implement fluid.

Optionally, the vehicle comprises an implement fluid pump power source adapted to power at least the implement fluid pump. The method comprises, in response to determining that the conditioning procedure should be initiated, operating the implement fluid pump power source so as to feed energy to the implement fluid pump.

Optionally, a single power source constitutes the transmission fluid pump power source as well as the implement fluid pump power source.

Optionally, the information associated with the temperature of the wheel axle fluid comprises information as regards a temperature ambient of the vehicle.

Optionally, the information associated with the temperature of the wheel axle fluid comprises information as regards a temperature of the wheel axle fluid.

Optionally, the wheel axle fluid circuit comprises a brake fluid circuit adapted to feed brake fluid to one or more brakes of the vehicle.

Optionally, the wheel axle fluid circuit comprises a wheel axle lubricant fluid circuit adapted to feed lubricant fluid to one or more wheel axles of the vehicle.

Optionally, the wheel axle fluid circuit comprises a wheel axle fluid pump arrangement adapted to circulate the wheel axle fluid through the wheel axle fluid circuit.

Optionally, the vehicle comprises a wheel axle fluid heat exchanger. The wheel axle fluid circuit is fluidly connected to the wheel axle fluid heat exchanger such that wheel axle fluid passes through the wheel axle fluid heat exchanger when the wheel axle fluid is circulated through the wheel axle fluid circuit.

Optionally, the vehicle further comprises a transmission fluid pump as well as a transmission converter, the transmission fluid pump being adapted to feed transmission fluid to the transmission converter. The transmission converter is arranged in relation to the wheel axle fluid heat exchanger such that transmission fluid leaving the transmission converter can be used as a heat source for the wheel axle fluid heat exchanger.

Optionally, the vehicle further comprises a transmission fluid heat exchanger being in fluid communication with the transmission converter as well as the wheel axle fluid heat exchanger so as to enable that transmission fluid leaving the transmission converter can be used as a heat source for the wheel axle fluid heat exchanger.

Optionally, the vehicle further comprises a heat exchanger circuit adapted to circulate a heat exchanger fluid between the transmission fluid heat exchanger and the wheel axle fluid heat exchanger.

BRIEF DESCRIPTION OF THE DRAWINGS

With reference to the appended drawings, below follows a more detailed description of embodiments of the invention cited as examples, wherein.

DETAILED DESCRIPTION

Figure 1:
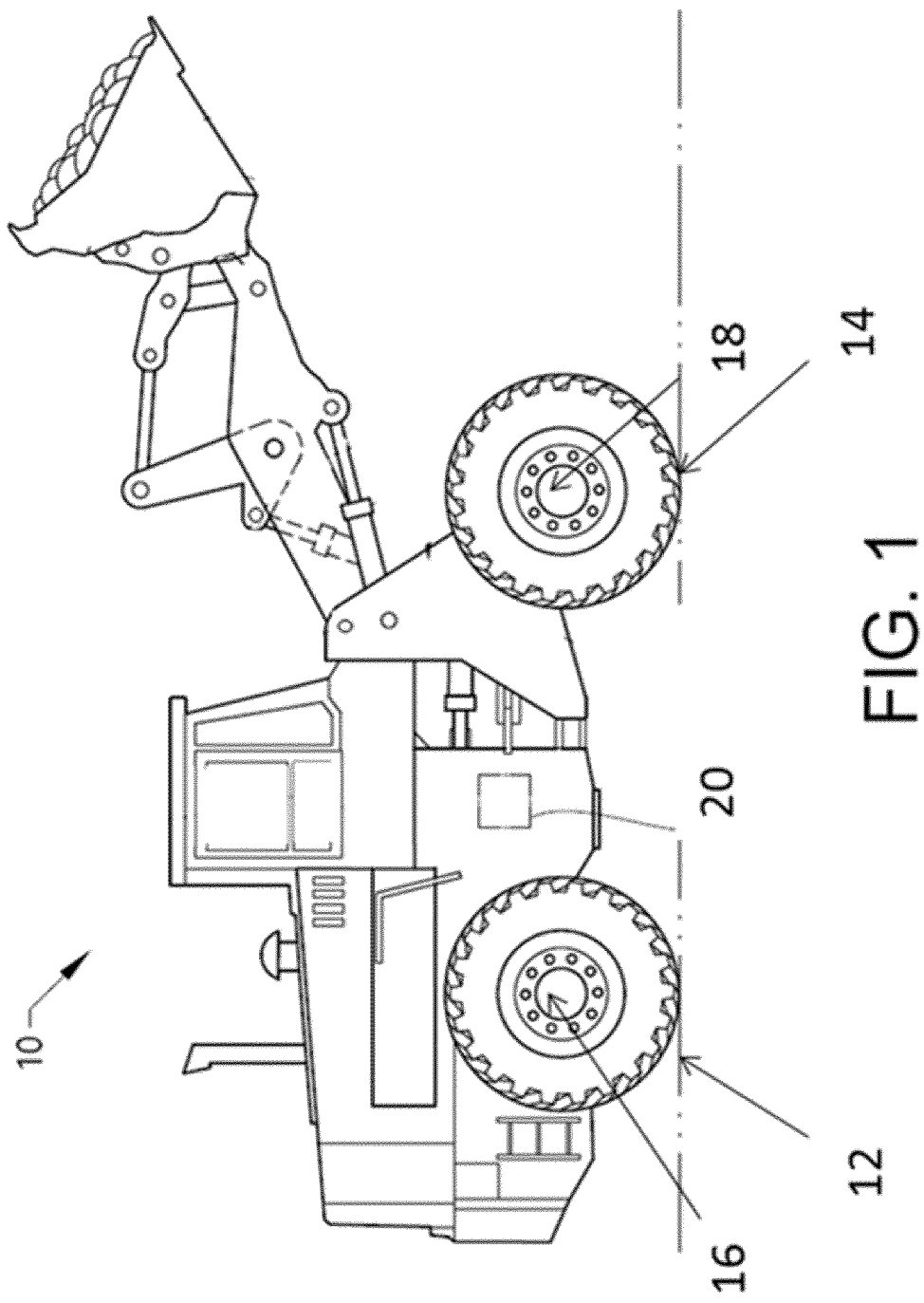
FIG. 1 schematically illustrates a working machine.

The present invention will now be described hereinafter with reference to the accompanying drawings, in which exemplary embodiments of the invention are shown. The invention may, however, be embodied in many different forms and should not be construed as limited to the embodiment set forth herein; rather, the embodiment is provided for thoroughness and completeness. Like reference character refer to like elements throughout the description.

FIG. 1 illustrates an embodiment of a vehicle 10. In FIG. 1, the vehicle 10 is exemplified as a working machine. More specifically, the FIG. 1 vehicle 10 is a wheel loader. However, other embodiments of the vehicle are also envisaged. Purely by way of example, the vehicle may an articulated hauler, an excavator and or a backhoe loader (not shown).

The FIG. 1 vehicle further comprises a set of wheel pairs 12, 14. Each wheel pair 12, 14 is connected to a body of the vehicle 10 via a wheel axle 16, 18. Moreover, illustrated in FIG. 1, the vehicle 10 further comprises a control unit 20.

Figure 2:
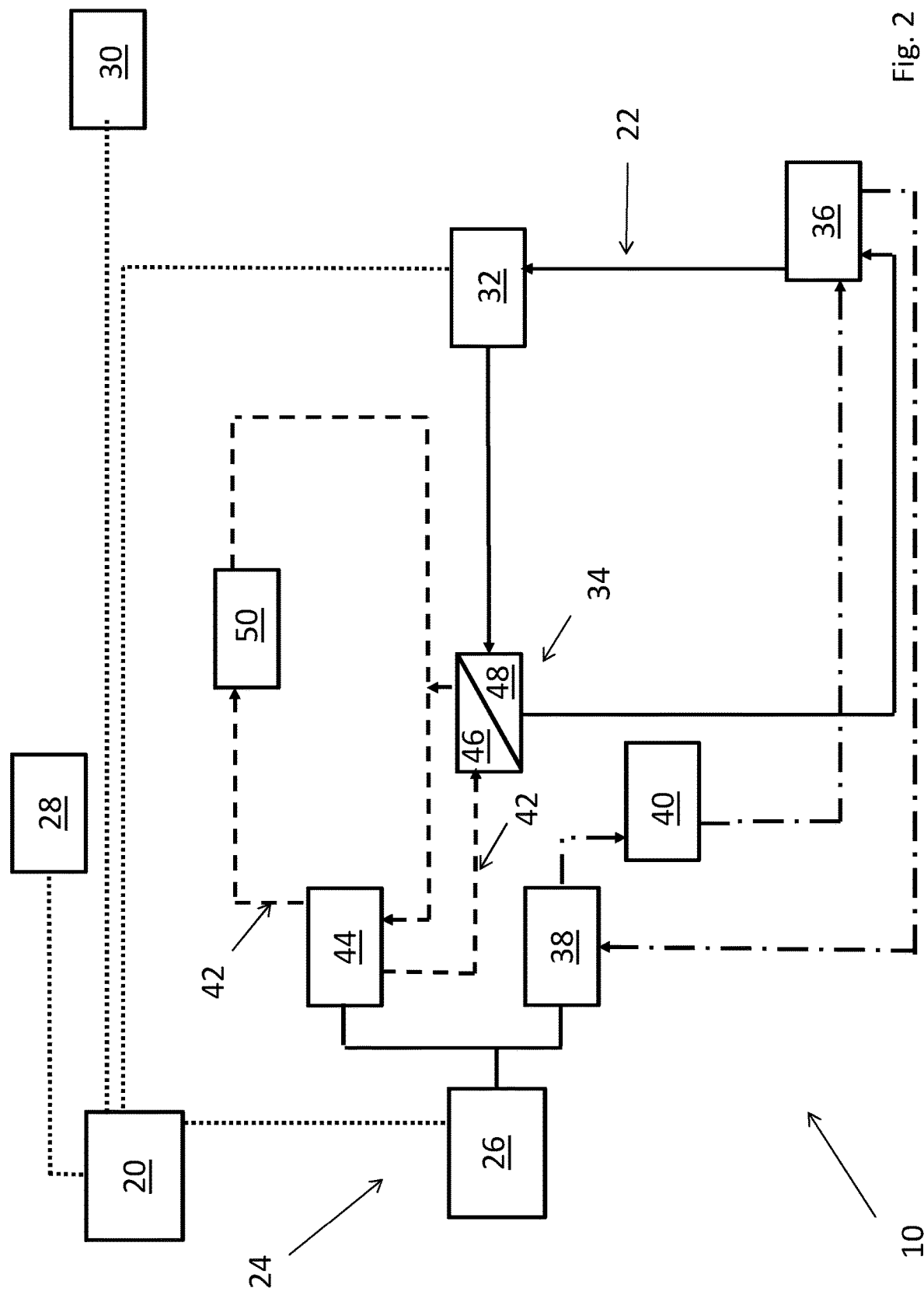
FIG. 2 schematically illustrates an embodiment of a vehicle according to the present invention.

FIG. 2 schematically illustrates components of a vehicle 10, such as the FIG. 1 vehicle 10. FIG. 2 illustrates that that the components comprise the control unit 20. The control unit 20 may issue instructions to one or more components of the vehicle 10. However, for the sake of clarity, FIG. 2 and FIG. 3 do not illustrate each possible information or instruction connection between the control unit 20 and the related component or components of the vehicle 10.

Furthermore, FIG. 2 illustrates that the vehicle 10 comprises a wheel axle fluid circuit 22 adapted to feed wheel axle fluid to one or more wheel axles (not shown in FIG. 2) of the vehicle 10. For the sake of clarity, the wheel axle fluid circuit 22 is illustrated by unbroken lines in FIG. 2.

As used herein, the term "wheel axle fluid" encompasses any fluid that is related to a wheel axle of a vehicle. Purely by way of example, the term "wheel axle fluid" may include on or more of the following: lubricant axel fluid and hydraulic brake fluid.

A lubricant axel fluid is used for lubricating one or more components, such as bearings, engaging with the wheel axle. For instance, a lubricant axle fluid may be used for lubricating bearings supporting the wheel axle.

A hydraulic brake fluid may be used for actuating brakes for wheels connected to the wheel axle. Alternatively, a hydraulic brake fluid may be used for braking directly a wheel axle.

Moreover, the vehicle 10 further comprises a propulsion assembly 24 adapted to propel the vehicle 10. In the FIG. 2 embodiment, the propulsion assembly comprises a power source 26. Purely by way of example, the power source 26 may comprise, or be constituted by, an internal combustion engine, an electric motor, a fuel cell arrangement or the like.

The control unit 20 is adapted to use information indicative of the propulsion assembly being inactive 26. Purely by way of example, and as indicated in FIG. 2, the control unit 20 may be adapted to receive a signal from the power source 26, which signal is indicative of whether or not the power source is running.

Moreover, the control unit 20 is adapted to use information indicative of an expected time range until an expected operation start time of the vehicle. To this end, though purely by way of example, the control unit 20 may be adapted to receive information from an external transmitter 28 indicative of such an expected time range. As a non-limiting example, the external transmitter may be adapted to communicate with the control unit 20 via wireless signals. As another non-limiting example, the control unit 20 may be adapted to determine the expected time range on the bases of previously planned or previously executed operating schedules performed by the vehicle 10.

Moreover, the control unit 20 is adapted to use information associated with a temperature of the wheel axle fluid. As a non-limiting example, the information associated with the temperature of the wheel axle fluid comprises information as regards a temperature ambient of the vehicle. To this end, though purely by way of example, the control unit 20 may be adapted to receive information from an ambient temperature information supplier 30. The ambient temperature information supplier 30 may for instance comprise a temperature sensor connected to the vehicle 10. As another non-limiting example, the ambient temperature information supplier 30 may comprise a link to a weather station, a weather forecast service, or the like.

Instead of, or in addition to, using information as regards a temperature ambient of the vehicle, the information associated with the temperature of the wheel axle fluid may comprise information as regards a temperature of the wheel axle fluid. As such, though purely by way of example, the control unit 20 may be adapted to receive information from a wheel axle fluid temperature sensor 32.

The control unit 20 is adapted to, on the basis of at least the above information, determine whether or not a conditioning procedure, during which the temperature of the wheel axle fluid is increased as compared to a present temperature of the wheel axle fluid, should be initiated for the wheel axle fluid.

As a non-limiting example, the control unit 20 may be adapted to determine an energy loss value indicative of energy losses associated with operating the vehicle 10 without initiating the conditioning procedure. Using the above-mentioned lubricant axel fluid as a non-limiting example of the wheel axle fluid, the control unit 20 may be adapted to determine the energy loss value indicative of energy losses associated with operating the vehicle 10 with relatively cold, and thus less viscous, lubricant axel fluid.

Moreover, the control unit 20 may further be adapted to determine a conditioning value indicative of the energy required for the conditioning procedure. Using the lubricant axel fluid again as a non-limiting example, the control unit 20 may be adapted to determine a conditioning value indicative of the energy required for heating the lubricant axel fluid to a desired temperature.

Additionally, though purely by way of example, the control unit 20 may be adapted to determine that the conditioning procedure should be initiated in response to determining that the conditioning value is smaller than the energy loss value.

Irrespective of how the control unit 20 is adapted to determine whether or not a conditioning procedure should be initiated, the control unit 20 may be adapted to, in response to determining that the conditioning procedure should be initiated, issue a signal to the vehicle 10 to initiate the conditioning procedure. Presented hereinbelow are various examples of how the conditioning procedure could be carried out.

FIG. 2 illustrates that the wheel axle fluid circuit comprises a wheel axle fluid pump arrangement 34 adapted to circulate the wheel axle fluid through the wheel axle fluid circuit 22. As a non-limiting example, the wheel axle fluid pump arrangement 34 may be adapted to be powered by an external power source (not shown in FIG. 2).

The control unit 20 may be adapted to, in response to determining that the conditioning procedure should be initiated, issue a wheel axle fluid pump arrangement control signal to the wheel axle fluid pump arrangement 34 to circulate the wheel axle fluid through the wheel axle fluid circuit 22 to thereby increase the temperature of the wheel axle fluid prior to the expected operation start time of the vehicle.

The temperature of the wheel axle fluid may increase by the circulation in the wheel axle fluid circuit 22 alone. However, as a non-limiting example, the vehicle 10 may comprise a wheel axle fluid heat exchanger 36. The wheel axle fluid circuit 22 is fluidly connected to the wheel axle fluid heat exchanger 36 such that wheel axle fluid passes through the wheel axle fluid heat exchanger 36 when the wheel axle fluid is circulated through the wheel axle fluid circuit 22. The control unit 20 may adapted to, in response to determining that the conditioning procedure should be initiated, issue a wheel axle fluid heat exchanger control signal 36 such that the wheel axle fluid heat exchanger 36 adds heat to the wheel axle fluid.

The axle fluid heat exchanger 36 may add heat to the wheel axle fluid in a plurality of different ways. To this end, FIG. 2 illustrates a non-limiting example in which the vehicle 10 further comprises a transmission fluid pump 38 as well as a transmission converter 40. The transmission fluid pump 38 is adapted to feed transmission fluid to the transmission converter 40. Moreover, the transmission converter 40 is arranged in relation to the wheel axle fluid heat exchanger 36 such that transmission fluid leaving the transmission converter 40 can be used as a heat source for the wheel axle fluid heat exchanger 36.

In the FIG. 2 embodiment, the transmission converter 40 is arranged in relation to the wheel axle fluid heat exchanger 36 such that fluid leaving the transmission converter 40 is fed to the wheel axle fluid heat exchanger 36. As such, in the FIG. 2 embodiment, the heat in the fluid leaving the transmission converter 40 is directly used for heating the wheel axle fluid heat exchanger 36. However, it is also envisaged that the heat in the fluid leaving the transmission converter 40 may indirectly be used for heating the wheel axle fluid heat exchanger 36. An example of such an indirect heating is discussed hereinbelow with reference to FIG. 3.

Irrespective of whether the leaving the transmission converter 40 is directly or indirectly used for heating the wheel axle fluid heat exchanger 36, the control unit 20 is adapted to, in response to determining that the conditioning procedure should be initiated, issue a transmission fluid pump control signal to the transmission fluid pump 38 such that the transmission fluid pump feeds transmission fluid to the transmission converter as well as to issue a transmission converter control signal to the transmission converter 40 to assume a transmission converter operating condition in which the temperature of the transmission fluid leaving the transmission converter is higher than the temperature of the transmission fluid entering the transmission converter.

As such, the transmission fluid leaving the transmission converter 40 may be used for heating the wheel axle fluid, e.g. via the wheel axle fluid heat exchanger 36.

Moreover, in the FIG. 2 embodiment, the vehicle 10 comprises a transmission fluid pump power source 26 adapted to power at least the transmission fluid pump 38. In fact, the FIG. 2 embodiment of the vehicle 10 comprises a power source 26 that is used to power at least the transmission fluid pump 38 as well as to power other components, as will be discussed further hereinbelow.

The control unit 20 may be adapted to, in response to determining that the conditioning procedure should be initiated, issue a transmission fluid pump power source control signal to the vehicle 10 such that the transmission fluid pump power source 26 feeds energy to the transmission fluid pump 38.

As also illustrated in FIG. 2, the vehicle may comprise an implement fluid circuit 42—indicated by broken lines in FIG. 2—with an implement fluid pump 44. Moreover, as exemplified in FIG. 2, the wheel axle fluid pump arrangement 34 may comprise a wheel axle fluid motor 46 and a wheel axle fluid pump 48. The wheel axle fluid motor 46 is mechanically connected to the wheel axle fluid pump 48.

The implement fluid circuit 42 is connected to the wheel axle fluid pump arrangement 34 such that implement fluid in the implement fluid circuit can power the wheel axle fluid motor 46. The control unit 20 is adapted to, in response to determining that the conditioning procedure should be initiated, issue an implement fluid pump control signal 44 such that the implement fluid in the implement fluid circuit powers the wheel axle fluid motor 46. Thus, the implement fluid pump 44 may be used for obtaining a flow in the wheel axle fluid circuit 22. Moreover, when implement fluid flows in the implement fluid circuit 42, the temperature thereof increases. The thus heated implement fluid powers the wheel axle fluid motor 46 which implies a heat exchange over the wheel axle fluid pump arrangement 34, viz from the implement fluid to the wheel axle fluid via the wheel axle fluid motor 46 and the wheel axle fluid pump 48.

Purely by way of example, the temperature of the implement fluid may be further increased. To this end, though purely by way of example, the implement fluid circuit 42 may comprise a variable implement fluid constriction 50. As a non-limiting example, the variable implement fluid constriction 50 may be a valve with a variable opening percentage. Moreover, the control unit 20 may be adapted to, in response to determining that the conditioning procedure should be initiated, issue an implement fluid constriction control signal to the implement fluid constriction 50 such that a flow restriction is imposed on the implement fluid, thereby increasing the temperature of the implement fluid.

Furthermore, as illustrated in FIG. 2, the vehicle comprises an implement fluid pump power source adapted to power at least the implement fluid pump 44. In the FIG. 2 embodiment, a single power source 26 constitutes the implement fluid pump power source as well as the previously discussed transmission fluid pump power source. However, it is also envisaged that embodiments of the vehicle 10 may comprise a separate implement fluid pump power source (not shown in FIG. 2).

Irrespective of the implementation of the implement fluid pump power source, the control unit 20 may be adapted to, in response to determining that the conditioning procedure should be initiated, issue an implement fluid pump power source control signal to the vehicle 10 such that the implement fluid pump power source 26 feeds energy to the implement fluid pump 44.

Figure 3:
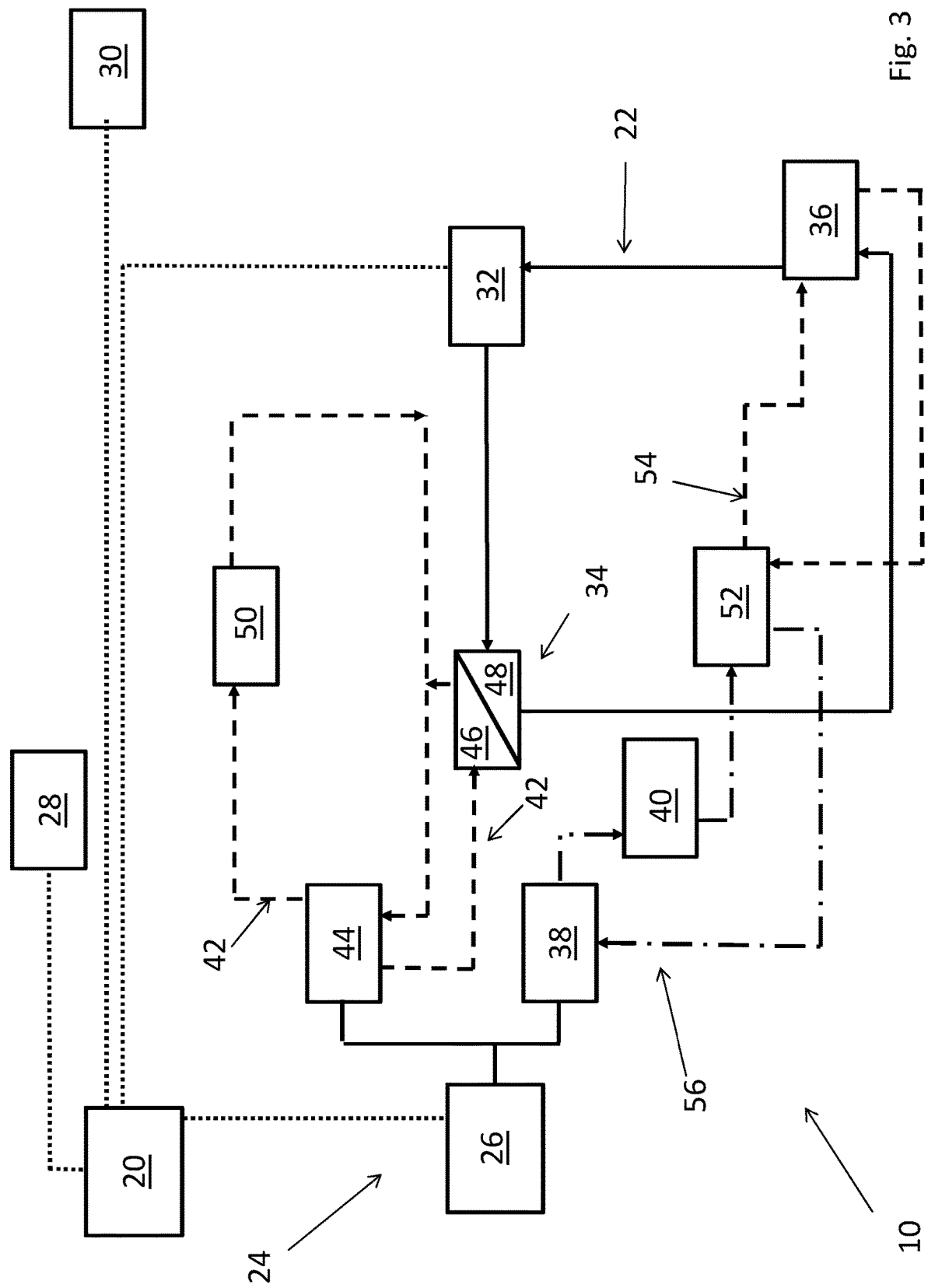
FIG. 3 schematically illustrates another embodiment of a vehicle according to the present invention.

FIG. 3 illustrates another embodiment of the vehicle 10 according to the present invention. The FIG. 3 embodiment comprises a plurality of components that are similar to the FIG. 2 embodiment.

However, as compared to the FIG. 2 embodiment, the FIG. 3 vehicle 10 further comprises a transmission fluid heat exchanger 52 being in fluid communication with the transmission converter 40 as well as the wheel axle fluid heat exchanger 36 so as to enable that transmission fluid leaving the transmission converter 40 can be used as a heat source for the wheel axle fluid heat exchanger 36. Purely by way of example, and as illustrated by broken lines in FIG. 3, the vehicle 10 may comprise a heat exchanger circuit 54 adapted to circulate a heat exchanger fluid between the transmission fluid heat exchanger 52 and the wheel axle fluid heat exchanger 36. Moreover, the FIG. 3 vehicle comprises a transmission fluid circuit 56, illustrated by dashed and dotted lines in FIG. 3, fluidly connecting the transmission fluid pump 38, the transmission converter 40 and the transmission fluid heat exchanger 52.

While the above description and examples of the present invention relates to the control unit 20 and the vehicle 10, it should be noted that the description should also be regarded as a presentation of the method according to the present invention.

As such, the present invention also relates to a method for controlling a wheel axle fluid circuit 22 of a vehicle 10. The wheel axle fluid circuit 22 is adapted to feed wheel axle fluid to one or more wheel axles 12, 14 of the vehicle 10. The vehicle 10 further comprises a propulsion assembly 26 adapted to propel the vehicle, wherein the method comprises, on the basis of at least the following:
  information indicative of the propulsion assembly 26 being inactive,
  information indicative of an expected time range until an expected operation start time of the vehicle 10, and
  information associated with a temperature of the wheel axle fluid, determining whether or not a conditioning procedure, during which the temperature of the wheel axle fluid is increased as compared to a present temperature of the wheel axle fluid, should be initiated for the wheel axle fluid.

It is to be understood that the present invention is not limited to the embodiments described above and illustrated in the drawings; rather, the skilled person will recognize that many changes and modifications may be made within the scope of the appended claims.

The invention claimed is:

1. A controller for a vehicle, said vehicle comprising a wheel axle fluid circuit adapted to feed wheel axle fluid to one or more wheel axles of said vehicle, said vehicle further comprising a propulsion assembly adapted to propel said vehicle, said controller being adapted to:
  on the basis of at least the following:
    information indicative of said propulsion assembly being inactive,
    information indicative of an expected time range until an expected operation start time of said vehicle, and
    information associated with a temperature of said wheel axle fluid,
  determine an energy loss value indicative of energy losses associated with operating the vehicle without initiating a conditioning procedure, during which the temperature of said wheel axle fluid is increased as compared to a present temperature of said wheel axle fluid;
  determine a conditioning value indicative of the energy required for the conditioning procedure;
  determine whether or not the conditioning procedure should be initiated for said wheel axle fluid;
  determine that said conditioning procedure should be initiated in response to determining that said conditioning value is smaller than said energy loss value; and
  in response to determining that said conditioning procedure should be initiated, issue a signal to circuitry of said vehicle, causing the circuitry of said vehicle to initiate said conditioning procedure.

2. The controller according to claim 1, wherein said information associated with the temperature of said wheel axle fluid comprises information as regards a temperature ambient of said vehicle.

3. The controller according to claim 1, wherein said information associated with the temperature of said wheel axle fluid comprises information as regards a temperature of said wheel axle fluid.

4. The controller according to claim 1, wherein said wheel axle fluid circuit comprises a brake fluid circuit adapted to feed brake fluid to one or more brakes of said vehicle.

5. The controller according to claim 1, wherein said wheel axle fluid circuit comprises a wheel axle lubricant fluid circuit adapted to feed lubricant fluid to one or more wheel axles of said vehicle.

6. A vehicle comprising a wheel axle fluid circuit adapted to feed wheel axle fluid to one or more wheel axles of said vehicle, said vehicle comprising the controller according to claim 1.

7. The vehicle according to claim 6, wherein said wheel axle fluid circuit comprises a wheel axle fluid pump arrangement adapted to circulate said wheel axle fluid through said wheel axle fluid circuit.

8. The vehicle according to claim 7, wherein said vehicle comprises a wheel axle fluid heat exchanger, said wheel axle fluid circuit being fluidly connected to said wheel axle fluid heat exchanger such that wheel axle fluid passes through said wheel axle fluid heat exchanger when said wheel axle fluid is circulated through said wheel axle fluid circuit.

9. The vehicle according to claim 8, wherein said vehicle further comprises a transmission fluid pump as well as a transmission converter, said transmission fluid pump being adapted to feed transmission fluid to said transmission converter, said transmission converter being arranged in relation to said wheel axle fluid heat exchanger such that transmission fluid leaving said transmission converter can be used as a heat source for said wheel axle fluid heat exchanger.

10. The vehicle according to claim 9, wherein said vehicle further comprises a transmission fluid heat exchanger being in fluid communication with said transmission fluid converter as well as said wheel axle fluid heat exchanger so as to enable that transmission fluid leaving said transmission converter can be used as a heat source for said wheel axle fluid heat exchanger.

11. The vehicle according to claim 10, wherein said vehicle further comprises a heat exchanger circuit adapted to circulate a heat exchanger fluid between said transmission fluid heat exchanger and said wheel axle fluid heat exchanger.

12. A controller for a vehicle, said vehicle comprising a wheel axle fluid circuit adapted to feed wheel axle fluid to one or more wheel axles of said vehicle, said vehicle further comprising a propulsion assembly adapted to propel said vehicle, said controller being adapted to:
on the basis of at least the following:
information indicative of said propulsion assembly being inactive,
information indicative of an expected time range until an expected operation start time of said vehicle, and
information associated with a temperature of said wheel axle fluid,
determine whether or not a conditioning procedure, during which the temperature of said wheel axle fluid is increased as compared to a present temperature of said wheel axle fluid, should be initiated for said wheel axle fluid;
wherein said vehicle comprises a wheel axle fluid heat exchanger, said wheel axle fluid circuit being fluidly connected to said wheel axle fluid heat exchanger such that wheel axle fluid passes through said wheel axle fluid heat exchanger when said wheel axle fluid is circulated through said wheel axle fluid circuit, wherein said vehicle further comprises a transmission fluid pump as well as a transmission converter, said transmission fluid pump being adapted to feed transmission fluid to said transmission converter, said transmission converter being arranged in relation to said wheel axle fluid heat exchanger such that transmission fluid leaving said transmission converter can be used as a heat source for said wheel axle fluid heat exchanger, said controller being adapted to:
in response to determining that said conditioning procedure should be initiated, issue a wheel axle fluid heat exchanger control signal such that the wheel axle fluid heat exchanger adds heat to the wheel axle fluid; and
in response to determining that said conditioning procedure should be initiated, issue a transmission fluid pump control signal to said transmission fluid pump such that said transmission fluid pump feeds transmission fluid to said transmission converter as well as to issue a transmission converter control signal to said transmission converter to assume a transmission converter operating condition in which the temperature of the transmission fluid leaving said transmission converter is higher than the temperature of said transmission fluid entering said transmission converter.

13. The controller according to claim 12, wherein said vehicle comprises a transmission fluid pump power source adapted to power at least said transmission fluid pump, said controller being adapted to, in response to determining that said conditioning procedure should be initiated, issue a transmission fluid pump power source control signal to said vehicle such that said transmission fluid pump power source feeds energy to said transmission fluid pump.

14. A controller for a vehicle, said vehicle comprising a wheel axle fluid circuit adapted to feed wheel axle fluid to one or more wheel axles of said vehicle, said vehicle further comprising a propulsion assembly adapted to propel said vehicle, said controller being adapted to:
on the basis of at least the following:
information indicative of said propulsion assembly being inactive,
information indicative of an expected time range until an expected operation start time of said vehicle, and
information associated with a temperature of said wheel axle fluid,
determine whether or not a conditioning procedure, during which the temperature of said wheel axle fluid is increased as compared to a present temperature of said wheel axle fluid, should be initiated for said wheel axle fluid;
wherein said wheel axle fluid circuit comprises a wheel axle fluid pump arrangement adapted to circulate said wheel axle fluid through said wheel axle fluid circuit, wherein said vehicle comprises an implement fluid circuit with an implement fluid pump, said wheel axle fluid pump arrangement comprising a wheel axle fluid motor and a wheel axle fluid pump, said wheel axle fluid motor being mechanically connected to said wheel axle fluid pump, said implement fluid circuit being connected to said wheel axle fluid pump arrangement such that implement fluid in said implement fluid circuit can power said wheel axle fluid motor, said controller being adapted to:
in response to determining that said conditioning procedure should be initiated, issue a wheel axle fluid pump arrangement control signal to said wheel axle fluid pump arrangement to circulate said wheel axle fluid through said wheel axle fluid circuit to thereby increase the temperature of said wheel axle fluid prior to said expected operation start time of said vehicle; and
in response to determining that said conditioning procedure should be initiated, issue an implement fluid pump control signal such that said implement fluid in said implement fluid circuit powers said wheel axle fluid motor.

15. The controller according to claim 14, wherein said implement fluid circuit comprises a variable implement fluid constriction, said controller being adapted to, in response to determining that said conditioning procedure should be initiated, issue an implement fluid constriction control signal to said implement fluid constriction such that a flow restriction is imposed on said implement fluid, thereby increasing the temperature of the implement fluid.

16. The controller according to claim 15, wherein said vehicle comprises an implement fluid pump power source adapted to power at least said implement fluid pump, said controller being adapted to, in response to determining that said conditioning procedure should be initiated, issue an implement fluid pump power source control signal to said vehicle such that said implement fluid pump power source feeds energy to said implement fluid pump.

\* \* \* \* \*